United States Patent
Li et al.

(10) Patent No.: US 12,122,868 B2
(45) Date of Patent: Oct. 22, 2024

(54) HYDROXYL-TERMINATED POLYBUTADIENE-BASED POLYURETHANE (HTPB-PU)-MODIFIED ASPHALT AND PREPARATION METHOD THEREOF

(71) Applicant: TONGJI UNIVERSITY, Shanghai (CN)

(72) Inventors: Hui Li, Shanghai (CN); Xin Zuo, Shanghai (CN); Yuzhao Han, Shanghai (CN); Ning Xie, Shanghai (CN); Ming Jia, Shanghai (CN); Bing Yang, Shanghai (CN); Jiawen Liu, Shanghai (CN); Xue Zhang, Shanghai (CN); Yu Tian, Shanghai (CN); Yuzhe Jiang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/495,543

(22) Filed: Oct. 26, 2023

(65) Prior Publication Data
US 2024/0191020 A1 Jun. 13, 2024

(30) Foreign Application Priority Data
Dec. 13, 2022 (CN) .......................... 202211600234.0

(51) Int. Cl.
*C08G 18/64* (2006.01)
*C08G 18/10* (2006.01)
*C08G 18/62* (2006.01)
*C08L 95/00* (2006.01)

(52) U.S. Cl.
CPC .......... *C08G 18/6476* (2013.01); *C08G 18/10* (2013.01); *C08G 18/6204* (2013.01); *C08L 95/00* (2013.01); *C08L 2555/86* (2013.01)

(58) Field of Classification Search
None
See application file for complete search history.

(56) References Cited

U.S. PATENT DOCUMENTS

| | | | |
|---|---|---|---|
| 3,637,558 A * | 1/1972 | Verdol | C08K 5/01 524/871 |
| 5,837,795 A * | 11/1998 | Lomoelder | C09D 175/04 528/73 |
| 2001/0051676 A1 * | 12/2001 | Rajalingam | C08G 18/6476 524/62 |
| 2003/0088041 A1 * | 5/2003 | Hashimoto | C08G 18/6659 528/10 |
| 2003/0187152 A1 * | 10/2003 | Shimura | A63B 37/00221 525/450 |
| 2004/0049003 A1 * | 3/2004 | Asahina | C09D 175/04 528/60 |

OTHER PUBLICATIONS

Zou, "Effects of Interface Modifier on Asphalt Concrete Mixture Performance and Analysis of its Mechanism", International Journal of Pavement Research and Technology, vol. 5 No. 6, pp. 419-427, Nov. 2012. (Year: 2012).*

* cited by examiner

*Primary Examiner* — Christopher M Rodd
(74) *Attorney, Agent, or Firm* — Schwabe, Williamson & Wyatt, P.C.

(57) ABSTRACT

Disclosed are a hydroxyl-terminated polybutadiene-based polyurethane (HTPB-PU)-modified asphalt and a preparation method thereof. In the disclosure, the HTPB-PU-modified asphalt includes the following components in parts by weight: 90 parts to 97 parts of a base asphalt and 3 parts to 10 parts of HTPB-PU, where the HTPB-PU is prepared from raw materials including an isocyanate and a polyol, and the polyol includes hydroxyl-terminated polybutadiene (HTPB) with a weight percentage of not less than 80%.

8 Claims, No Drawings

HYDROXYL-TERMINATED POLYBUTADIENE-BASED POLYURETHANE (HTPB-PU)-MODIFIED ASPHALT AND PREPARATION METHOD THEREOF

CROSS-REFERENCE TO RELATED APPLICATION

This US patent application claims the benefit and priority of Chinese Patent Application No. 202211600234.0, filed with the China National Intellectual Property Administration on Dec. 13, 2022, the entire disclosure of which is incorporated by reference herein in its entirety and for all purposes.

TECHNICAL FIELD

The present disclosure relates to the technical field of road asphalt materials, and in particular to a hydroxyl-terminated polybutadiene-based polyurethane (HTPB-PU)-modified asphalt and a preparation method thereof.

BACKGROUND

Asphalt is an important road paving material. The development of transportation puts forward higher requirements on the performance of road asphalt materials. The modification methods of road asphalt are classified as two categories: physical modification and chemical modification. Physical modification methods include adding plastic modifiers such as polyethylene, polypropylene, polyvinyl chloride, and polystyrene, and adding rubber modifiers such as styrene-butadiene-styrene (SBS), styrene-butadiene rubber, and neoprene. The SBS physical modifier has become the most commonly used asphalt modifier at present due to its comprehensive advantages such as desirable modification effect, excellent universal applicability to asphalt, and moderate cost. Chemical modification methods include adding two-component epoxy modifiers, styrene chemical modifiers, rosin-modified phenolic resin modifiers, and acrylate polymer modifiers. However, chemical modifiers are limited in large-scale application due to modification effects or cost issues. For example, epoxy modifiers are several times more expensive than current SBS resins, and are only used in limited occasions such as bridge decks. Moreover, performance of the epoxy modifier cannot meet the requirements of high-temperature or low-temperature environments for road asphalt, and the process for application is relatively complicated. For example, U.S. Pat. No. 5,348,994 provides a polymer-modified asphalt and a preparation method thereof. The asphalt composition includes a sulfonated asphalt, a sulfonated polymer, and an alkaline neutralizer. The preparation method includes: using a polymer including styrene-dienes as a modifier; dissolving the modifier with a solvent, sulfonating the polymer with a sulfonating agent to obtain a sulfonated polymer, simultaneously sulfonating an asphalt to obtain a sulfonated asphalt; and blending the sulfonated polymer and the sulfonated asphalt, and neutralizing a resulting blend with a neutralizing agent to obtain a modified asphalt product; alternatively, neutralizing the sulfonated polymer and the sulfonated asphalt respectively, and then blending. The product has desirable stability, and can be stored at 160° C. for 3 d to 5 d without delamination. Samples are taken at top one third and bottom one third of the product, and the samples have a softening point difference of not more than 4° C. However, the preparation method has complex procedures and strict requirements on equipment and process. Moreover, a large amount of sulfonating agent is prone to environmental pollution.

Polyurethane (PU) is one of the six synthetic polymers. As early as 1849, German chemist Wurz prepared aliphatic isocyanate. By 1937, Dr. Otto Bayer adopted isocyanate for the synthesis of PU for the first time to obtain PU fibers and PU elastomers. After the 1970s, the research on PU entered a new era with the goals of high performance and efficiency, low pollution, and energy saving. PU has the following chemical structural characteristics: the macromolecular main chain of PU contains repeated carbamate segments, the main chain consists of a flexible segment (composed of oligomer polyols) with a glass transition temperature lower than ambient temperature and a rigid segment (composed of isocyanate and a small-molecule chain extender/cross-linker) with a glass transition temperature greater than ambient temperature. At present, most of the research on PU-modified asphalt focuses on the use of low-volume PU elastomers. However, for most different types of PU, the modification effect is general. In particular, segregation is likely to occur during high-temperature storage and transportation, indicating a poor storage stability. This problem greatly restricts the scope of applications for modified asphalt in engineering. Accordingly, it is of great significance to effectively avoid the segregation of modified asphalt while meeting the requirements of various performance indicators.

SUMMARY

Technical Problem to be Solved by the Present Disclosure

To solve the above technical problems in the prior art, an object of the present disclosure is to provide an HTPB-PU-modified asphalt. The modified asphalt has excellent high-temperature stability and low-temperature crack resistance, and exhibits an outstanding storage stability. Therefore, the modified asphalt avoids segregation during the high-temperature storage and transportation, and has desirable engineering application values.

Another object of the present disclosure is to provide a method for preparing the HTPB-PU-modified asphalt. The method has a simple process, easy control, low production cost, and no need of external admixture or compatibilizer. The modified asphalt prepared by the method has desirable storage stability.

Technical Solutions for Resolving the Technical Problems

Through long-term research, it is found that the above technical problems can be solved by the implementation of the following technical solutions:

[1] An HTPB-PU-modified asphalt, including the following components in parts by weight: 90 parts to 97 parts of a base asphalt and 3 parts to 10 parts of HTPB-PU, wherein the HTPB-PU is prepared from raw materials including an isocyanate and a polyol, and the polyol includes hydroxyl-terminated polybutadiene (HTPB) with a weight percentage of not less than 80%.

[2] The HTPB-PU-modified asphalt according to [1], wherein the raw materials for preparing the HTPB-PU include 70 parts to 85 parts of the HTPB and 12 parts to 25 parts of the isocyanate, based on to 100 parts by weight of a total weight of the raw materials, and further include a chain extender and a catalyst.

[3] The HTPB-PU-modified asphalt according to [1] or [2], wherein the isocyanate includes one or more selected from the group consisting of an aliphatic diisocyanate, an alicyclic diisocyanate, and an aromatic diisocyanate, preferably is at least one selected from the group consisting of toluene diisocyanate (TDI), dicyclohexylmethane-4,4'-diisocyanate (HMDI), isophorone diisocyanate (IPDI), and tetramethyl xylylene diisocyanate (TMXDI).

[4] The HTPB-PU-modified asphalt according to [2] or [3], wherein the chain extender includes one selected from the group consisting of an alcohol chain extender and a polyamine chain extender; further, the alcohol chain extender includes at least one selected from the group consisting of ethylene glycol, hexanediol, octanediol, decanediol, 1,3-butanediol, 1,4-butanediol, 1,6-hexanediol, and neopentyl glycol; and the polyamine chain extender is an organic or inorganic primary amine-based or secondary amine-based functional compound with at least two active hydrogen atoms.

[5] The HTPB-PU-modified asphalt according to any one of [1] to [4], wherein the base asphalt is a petroleum asphalt, and the petroleum asphalt includes at least one selected from the group consisting of 50 #, 70 #, 90 #, and 110 # base asphalts.

[6] The HTPB-PU-modified asphalt according to any one of [1] to [5], wherein the HTPB-PU-modified asphalt has a difference of not greater than 0.5° C. between an upper softening point and a lower softening point under a segregation test at 163±5° C.

[7] A method for preparing the HTPB-PU-modified asphalt according to any one of [1] to [6], including the following steps:
(1) mixing the isocyanate with the polyol by stirring to obtain a PU prepolymer;
(2) adding the PU prepolymer into the base asphalt and stirring with a stirrer to obtain a mixture; and
(3) adding a chain extender and a catalyst into the mixture obtained in step (2) and continuously stirring to obtain the HTPB-PU-modified asphalt.

[8] The method according to [7], wherein the mixing by stirring in step (1) is conducted at a temperature of 110-130° C. and/or at 350-500 r/min for 4-5 h.

[9] The method according to [7] or [8], wherein the stirring in step (2) is conducted at a temperature of 160-190° C. and/or at 1,200-1,500 r/min for 20-30 min.

[10] The method according to any one of [7] to [9], wherein the stirring in step (3) is conducted at a temperature of 160-190° C. and/or for 1.5-2.5 h.

The Present Disclosure has the Following Beneficial Effects

In the present disclosure, the HTPB-PU-modified asphalt has desirable comprehensive properties. In particular, the modified asphalt has excellent storage stability without a compatibilizer, effectively avoiding the segregation of asphalt materials during high-temperature storage and transportation. Meanwhile, the modified asphalt shows high-temperature stability and low-temperature crack resistance comparable to those of conventional SBS-modified asphalt, and has practical application prospects. Therefore, the modified asphalt can meet road paving requirements under different external temperature environments, and can effectively prolong a service life of the road. In the preparation method of the HTPB-PU-modified asphalt, the prepolymer, the chain extender, and the catalyst are mixed in twice. The preparation method has a simple process, easy control, short preparation time, low production cost, and no need of external admixture or compatibilizer. In this way, a product with excellent storage stability can be prepared. In some preferred embodiments, the HTPB-PU-modified asphalt also has a comparable softening point and lower penetration than those of conventional SBS-modified asphalt. This indicates that the modified asphalt has desirable high temperature resistance and temperature sensitivity.

It should be noted that the above descriptions do not disclose all the embodiments of the present disclosure and all advantages of the present disclosure.

DETAILED DESCRIPTION OF THE EMBODIMENTS

To better illustrate the present disclosure, numerous specific details are given in the following specific embodiments. Persons skilled in the art should understand that the present disclosure can also be implemented without certain specific details. In some other embodiments, in order to highlight the subject matter of the present disclosure, the methods, means, equipment, and steps well-known to persons skilled in the art are not described in detail.

Unless otherwise specified, all technical and scientific terms used in the present disclosure have the same meaning as commonly understood by one of ordinary skill in the technical field to which the present disclosure belongs.

In this description, the numerical range represented by "numerical value A to numerical value B" means a range which includes numerical values A and B of end points.

In this description, the meaning expressed by "may/can" includes a meaning of conducting certain processing and not conducting the certain processing.

It should be understood that a singular form of the article "a/an/the" as used in the description and claims of this application includes plural referents unless the context clearly dictates otherwise.

In this description, "one or some specific/preferred embodiments/solutions", "another or some other specific/preferred embodiments/solutions", "one or another embodiment/solution", and "one or another technical solution" mean that the specific elements (for example, features, structures, properties, and/or characteristics) described in relation to the embodiment are included in at least one embodiment described herein, and can be included in other embodiments or may not be included in other embodiments. In addition, it should be understood that the described elements may be combined in any suitable manner in various embodiments.

The terms "comprising/including" and any variations thereof in the description and claims of the present disclosure are intended to cover non-exclusive inclusion. For example, a process, method, system, product, or device that includes a list of steps or units is not necessarily limited to those steps or units which are listed, but optionally may further include other steps or units which are not listed or inherent to such a process, method, system, product, or device.

<HTPB-PU-Modified Asphalt>

The present disclosure provides an HTPB-PU-modified asphalt. In the present disclosure, the "HTPB-PU-modified asphalt" refers to a product obtained by modifying an asphalt with a polyurethane (PU) modifier HTPB-PU.

HTPB-PU

Hydroxyl-terminated polybutadiene-based polyurethane (HTPB-PU) is a type of PU prepared by subjecting HTPB as a main polyol raw material (in the present disclosure, "the polyol includes more than 80% by weight of HTPB" means that the HTPB accounts for more than 80%, even 100% by weight of the polyol) to a reaction with an isocyanate and a chain extender. In some specific embodiments, the HTPB-PU is preferably thermoplastic PU. Compared with thermosetting PU, the thermoplastic PU shows excellent elasticity and deformation properties, in which HTPB can absorb light components in asphalt to achieve swelling, and a small amount of modified asphalt can show excellent high temperature performance and storage stability. Moreover, the thermoplastic PU shows low-temperature performance equivalent to that of conventional SBS-modified asphalt, and has practical application prospects.

In the present disclosure, the HTPB-PU is prepared from raw materials including an isocyanate and a polyol. The polyol includes HTPB with a weight percentage of not less than 80%. In some embodiments, in addition to the HTPB, at least one of common oligomer diols such as polyether diol, polyoxyethylene diol, polyoxypropylene diol, and polytetrahydrofuran diol may be added. In some preferred embodiments, in order to obtain better performance and simpler preparation process, the polyol consists of HTPB, that is, a weight percentage of the HTPB to a total mass of the polyol is 100%. In some specific embodiments, the HTPB has a number-average molecular weight of 500 to 6,000, preferably 2,000 to 4,000, and a hydroxyl value of 25 mg·KOH/g to 45 mg·KOH/g. The HTPB can be obtained commercially, such as HTPB produced by Shandong Jiaying Chemical Technology Co., Ltd. In some specific embodiments, based on 100 parts by weight of a total mass of the raw materials of the HTPB-PU, HTPB may be used in an amount of 70 parts to 85 parts by weight, preferably 75 parts to 82 parts by weight. A relatively high HTPB content is beneficial to obtain a modified asphalt with an excellent storage stability.

In some specific embodiments of the present disclosure, the isocyanate includes one or more selected from the group consisting of an aliphatic diisocyanate, an alicyclic diisocyanate, and an aromatic diisocyanate, and preferably is at least one selected from the group consisting of TDI, HMDI, IPDI, and TMXDI. In a preferred embodiment, the isocyanate is the alicyclic diisocyanate, preferably IPDI. The IPDI has low reactivity with hydroxyl groups and shows desirable weather resistance. In some specific embodiments, based on 100 parts by weight of a total mass of the raw materials of the HTPB-PU, the isocyanate may be used in an amount of 12 parts to 25 parts by weight, preferably 15 parts to 23 parts by weight.

In some specific embodiments of the present disclosure, the raw materials of the HTPB-PU further include a chain extender and a catalyst. In some embodiments, the chain extender includes but not limited to an alcohol chain extender or a polyamine chain extender. In some embodiments, the alcohol chain extender includes but not limited to at least one selected from the group consisting of ethylene glycol, hexanediol, octanediol, decanediol, 1,3-butanediol, 1,4-butanediol, 1,6-hexanediol, neopentyl glycol, and diethylene glycol. In some embodiments, the polyamine chain extender is an organic or inorganic primary amine-based or secondary amine-based functional compound with at least two active hydrogen atoms, including but not limited to at least one selected from the group consisting of ethylenediamine, 2-methyl-1,5-pentanediamine, isophoronediamine, hydrazine, hydroxyethylenediamine, hexamethylenediamine, diethylenetriamine, triethylenetetramine, cyclohexanediamine, phenylenediamine, toluenediamine, and dicyclohexylmethanediamine. In a preferred embodiment, the chain extender may be at least one selected from the group consisting of 1,4-butanediol, 1,3-butanediol, and 1,6-hexanediol, and preferably is 1,4-butanediol. In some specific embodiments, based on 100 parts by weight of a total mass of the raw materials of the HTPB-PU, the chain extender may be used in an amount of 3 parts to 8 parts by weight, preferably 4 parts to 6 parts by weight. In some specific embodiments, the catalyst may be one or two or more selected from the group consisting of tertiary amine catalysts and organometallic catalysts. In some embodiments, the organometallic catalyst may be one or two or more selected from the group consisting of esters or salts of C5 to C20 organic acids (preferably caprylic acid, isooctanoic acid, acetic acid, or lauric acid) of lead, tin, zinc, bismuth, or zirconium. In some preferred embodiments, in order to shorten a preparation time, the catalyst may be esters of C5 to C20 organic acids of tin, and preferably, the catalyst is dibutyltin dilaurate. In some specific embodiments, based on 100 parts by weight of a total mass of the raw materials of the HTPB-PU, the catalyst may be used in an amount of 0.01 parts to 0.2 parts by weight, preferably 0.05 parts to 0.15 parts by weight, more preferably 0.08 parts to 0.12 parts by weight.

Base Asphalt

In the present disclosure, there is no special limitation on the base asphalt. In the present disclosure, the base asphalt includes asphalts obtained by different processing methods, or asphalts refined from crude oil in different regions. In some specific embodiments, the base asphalt can be a petroleum asphalt, and the petroleum asphalt is one or a mixture of two or more selected from the group consisting of a straight-run asphalt, a solvent-deoiled asphalt, an oxidized asphalt, and a blended asphalt. In some specific embodiments, the petroleum asphalt includes at least one selected from the group consisting of 50 #, 70 #, 90 #, and 110 # base asphalts. In a preferred embodiment, the base asphalt is the 70 # base asphalt.

In the present disclosure, the modified asphalt prepared with a small amount of the HTPB-PU can exhibit excellent high-temperature performance and storage stability. Based on 100 parts by weight of a total mass of the modified asphalt, the base asphalt is used in an amount of 90 parts to 97 parts by weight, preferably 91 parts to 94 parts by weight. The HTPB-PU is used in an amount of 3 parts to 10 parts by weight. In order to further improve the storage stability and softening point, the HTPB-PU is preferably used in an amount of 7 parts to 9 parts by weight.

<Preparation Method of the HTPB-PU-Modified Asphalt>

The present disclosure provides a method for preparing the HTPB-PU-modified asphalt as described in the above technical solutions, including the following steps:

(1) mixing the isocyanate with the polyol by stirring to obtain a PU prepolymer;

(2) adding the PU prepolymer into the base asphalt and stirring with a stirrer to obtain a mixture; and (3) adding a chain extender and a catalyst into the mixture obtained in step (2) and continuously stirring to obtain the HTPB-PU-modified asphalt.

Compared with the conventional method of preparing a PU modifier first and then mixing the PU modifier with a asphalt, by the method for preparing modified asphalt in situ of the present disclosure, the compatibility between modifier and base asphalt is better, and it is more easier to prepare a modified asphalt with desirable storage stability. In some specific embodiments, preferably no compatibilizer is added.

In some specific embodiments of the present disclosure, each component is weighed in parts by weight according to a ratio requirement of the base asphalt and the HTPB-PU.

Then the isocyanate and the polyol including the HTPB are mixed and stirred, preferably at high temperature, to obtain the PU prepolymer. In some specific embodiments, if not being used immediately, the prepared PU prepolymer should be stored under dry condition and oxygen exclusion. In some specific embodiments, the mixing by stirring in step (1) is conducted at a temperature of 110-130° C. and/or at 350-500 r/min for 4-5 h.

In the present disclosure, the PU prepolymer is added into the base asphalt and stirred with a stirrer to obtain a mixture. In some specific embodiments, the stirring in this step is conducted at a temperature of 160-190° C. and/or at 1,200-1,500 r/min for 20-30 min.

In the present disclosure, a chain extender and a catalyst are added into the mixture obtained in the previous step and continuously stirred to obtain the HTPB-PU-modified asphalt. In some specific embodiments, the stirring in this step is conducted at a temperature of 160-190° C. and/or for 1.5-2.5 h.

By controlling the temperature, stirring time, and stirring speed, it is beneficial to obtain a modified asphalt with improved compatibility, storage stability and other performance.

In some specific embodiments of the present disclosure, the HTPB-PU-modified asphalt has a difference of not greater than 0.5° C. between an upper softening point and a lower softening point under a segregation test at 163±5° C. (according to the "Standard Test Methods of Bitumen and Bituminous Mixtures for Highway Engineering" (JTG E20-2011)). This indicates that the modified asphalt has excellent storage stability. In some preferred embodiments, the difference between an upper softening point and a lower softening point is not greater than 0.2° C. At the same time, the HTPB-PU-modified asphalt is excellent in high-temperature stability and low-temperature crack resistance. In some specific embodiments, compared with the base asphalt, the HTPB-PU-modified asphalt has significantly improved high-temperature stability and softening point, and significantly reduced needle penetration, indicating a good engineering application value. In addition to being used as road paving materials, the HTPB-PU-modified asphalt also has possible application prospects in roof membranes, waterproof membranes, and sealing materials. The preparation method of the HTPB-PU-modified asphalt has a simple process, low requirements on equipment, no need of special equipment, and great flexibility in operation.

EXAMPLE

The technical solutions of the present disclosure will be further described below in conjunction with specific examples.

All raw materials used in this example are commercially available. The various performance indicators of IPDI (produced by Xuzhou Yihuiyang New Material Co., Ltd.), 1,4-butanediol (BDO, produced by Guangdong Yumay Chemical Co., Ltd.), HTPB (produced by Shandong Jiaying Chemical Technology Co., Ltd.), and dibutyltin dilaurate are shown in Table 1 to Table 4. The technical index of 70 # base asphalt (produced by Shell Company) complies with the technical requirements of JTGF40-2004 "Technical Specifications for Construction of Highway Asphalt Pavements".

TABLE 1

Physical property indicators of IPDI

| Name | Indicator |
| --- | --- |
| Molecular weight | 222.3 |
| NCO content (%) | ≥37.5 |
| Equivalent | 112 |
| Purity (%) | ≥99.5 |
| Viscosity at 25° C. (mPa · s) | 15 |
| Appearance state | Colorless liquid |

TABLE 2

Physical property indicators of 1,4-butanediol

| Name | Indicator |
| --- | --- |
| Molecular weight | 90 |
| Equivalent | 45 |
| Viscosity at 20° C. (mPa · s) | 70 |
| Appearance state | Colorless oily liquid |

TABLE 3

Physical property indicators of HTPB

| Name | Indicator |
| --- | --- |
| Equivalent | 1695 |
| Hydroxyl value (mg · KOH/g) | 33 |
| Viscosity at 40° C. (mPa · s) | ≤8500 |
| Acid value (mg · KOH/g) | <0.05 |
| Volatile matter fraction (%) | ≤0.05 |
| Appearance state | Colorless or transparent light yellow liquid |

TABLE 4

Physical property indicators of dibutyltin dilaurate

| Name | Indicator |
| --- | --- |
| Molecular weight | 631.51 |
| Viscosity at 20° C. (mPa · s) | ≤80 |
| Solubility | Soluble in polyols and most organic solvents |
| Appearance state | Yellow liquid |

Example 1

An HTPB-PU prepared by the following components were added into 70 # base asphalt to prepare an HTPB-PU-modified asphalt: IPDI, BDO, HTPB, and dibutyltin dilaurate. In percentage by weight, the content of the 70 # base asphalt was 93%, and the content of the HTPB-PU was 7%. The raw materials for synthesizing the HTPB-PU consisted of the following components in percentage by weight, 80% of HTPB, 4.2% of BDO, 15.7% of IPDI, and 0.1% of dibutyltin dilaurate.

A method for preparing the thermoplastic PU-modified asphalt was performed as follows:

step 1, IPDI and HTPB were mixed at a high temperature of 120° C. by stirring at a speed of 400 r/min for 4 h to obtain a PU prepolymer.

step 2, 70 # base asphalt was heated to a temperature of 170° C., the PU prepolymer was added into the 70 # base asphalt, and stirred with a stirrer for 30 min at 1,200 r/min, to mix the PU prepolymer and the base asphalt to be uniform, to obtain a mixture.

step 3, BDO and dibutyltin dilaurate were added into the mixture obtained in step 2, and stirred for 2 h to obtain the HTPB-PU-modified asphalt (marked as H7). BDO reacted with the PU prepolymer at high temperature and under the action of a catalyst, and the molecular chain of the prepolymer was extended. The synthesized PU had enhanced elasticity, and the PU absorbed light components in the asphalt and swelled, such that elastic properties of the asphalt were continuously improved. After the reaction of the prepolymer was complete, the viscosity of the asphalt did not rise any more, and the preparation of the HTPB-PU-modified asphalt was completed.

The test results of various performance indicators of the HTPB-PU-modified asphalt (H7) are shown in Table 5.

TABLE 5

Performance test results of the HTPB-PU-modified asphalt (H7)

| Test Item | Value | Unit | Technical requirements |
|---|---|---|---|
| High-temperature stability | PG76 | \ | \ |
| Low-temperature crack resistance | PG-22 | \ | \ |
| Brookfield viscosity (175° C.) | 2800 | mPa · s | ≤3600 mPa · s |
| Needle penetration (25° C., 100 g, 5 s) | 51.5 | 0.1 mm | 40-60 |
| Softening point $T_{R\&B}$ | 67.3 | ° C. | ≥45 |
| Difference between upper and lower softening points (160° C.) | 0.2 | ° C. | \ |

Test Methods were as Follows:

High-temperature stability (ASTM D7643): dynamic shear rheometer (DSR) time-scanning test was conducted on 6 asphalt samples in original state and obtained after thin film oven test (TFOT) short-term aging. The test temperature ranged from 58° C. to 88° C., with 6° C. as an interval. In this way, a complex shear modulus G* and a phase angle δ of asphalt at different temperatures were obtained. A rutting factor G*/sin δ was calculated. According to ASTM D7643, a threshold value of original asphalt was 1 kPa, and a threshold value of asphalt after short-term aging was 2.2 kPa. A maximum temperature at which the rutting factor satisfied these two conditions was defined as a high-temperature continuous classification temperature of asphalt.

Low-temperature crack resistance: a BBR low-temperature bending beam rheometer was used to test the low-temperature bending performance of asphalt. According to JTG E20-2011, a asphalt beam of 127 mm×12.7 mm×6.35 mm were prepared and placed in a BBR absolute ethanol test tank and held for more than 1 h before testing. The test temperature was set at −12° C., −18° C., and −24° C. During the test, a load of 980 mN±50 mN was applied to a middle position of the asphalt beam, and stopped after 240 s, and a software automatically recorded the displacement of the middle position of the beam over time. According to ASTM D7643, the bending creep stiffness S(60) and creep rate m(60) at 60 s were selected to evaluate the low-temperature performance of asphalt. Brookfield viscosity (JTG E20-2011): an asphalt rotational viscosity test (Brookfield viscometer method) was adopted. The needle penetration and softening point were tested based on JTG E20-2011.

Softening point difference test (JTG E20-2011): (1) The modified asphalt was sieved with a 0.3 mm sieve, heated until it could be fully poured, and stirred slightly and poured into a vertical sample holding tube slowly, with an amount of about 50 g. (2) An open end of an aluminum tube was pinched into a thin piece, folded more than twice, and then clamped and sealed with a small clip. The sample tube was placed together with a shelf (or beaker) into an oven at 163° C.±5° C., and allowed to stand for 48 h±1 h without any disturbance. (3) After heating, the sample tube together with the shelf were taken out and put into a freezer while keeping the sample tube upright for no less than 4 h to make the sample condense into a solid. When the sample was warmed slightly and became soft, the sample tube was cut into 3 equal sections by a scissor, and samples at top one third and bottom one third were collected and put into sample boxes or small beakers, respectively, and then melt at 163° C.±5° C. in an oven, and the cut aluminum tubes were taken out. (4) After stirring slightly, the asphalt samples at top and bottoms were poured into a softening point test mold separately, and subjected to softening point test, and a difference was calculated. Two parallel experiments were conducted and an average was calculated.

From the above test results, it can be seen that all performance indicators of the HTPB-PU-modified asphalt (H7) met the requirements. The modified asphalt has excellent high-temperature stability and low-temperature crack resistance, and exhibits an outstanding storage stability. The difference between the upper and lower softening points is only 0.2° C. The modified asphalt can avoid segregation during the high-temperature storage and transportation, and had desirable engineering application values.

Example 2

This example was the same as Example 1 except that the content of 70 # base asphalt was changed to 97%, and the content of the HTPB-PU was changed to 3%. The obtained HTPB-PU-modified asphalt was marked as H3.

Example 3

This example was the same as Example 1 except that the content of 70 # base asphalt was changed to 95%, and the content of the HTPB-PU was changed to 5%. The obtained HTPB-PU-modified asphalt was marked as H5.

Example 4

This example was the same as Example 1 except that the content of 70 # base asphalt was changed to 91%, and the content of the HTPB-PU was changed to 9%. The obtained HTPB-PU-modified asphalt was marked as H9.

The test results of various performance indicators of the HTPB-PU-modified asphalts (H3, H5, and H9) are shown in Table 6.

TABLE 6

Performance test results of the HTPB-PU-modified asphalts (H3, H5, and H9)

| Test Item | H3 | H5 | H9 | Unit | Technical requirements |
|---|---|---|---|---|---|
| High-temperature stability | PG76 | PG76 | PG76 | \ | \ |
| Low-temperature crack resistance | PG-22 | PG-22 | PG-22 | \ | \ |
| Brookfield viscosity (175° C.) | 200 | 500 | 3100 | mPa · s | ≤3600 mPa · s |
| Needle penetration | 54.3 | 53.7 | 49.4 | 0.1 mm | 40-60 |

TABLE 6-continued

Performance test results of the HTPB-PU-modified asphalts (H3, H5, and H9)

| Test Item | H3 | H5 | H9 | Unit | Technical requirements |
|---|---|---|---|---|---|
| (25° C., 100 g, 5 s) | | | | | |
| Softening point T$_{R\&B}$ | 51.3 | 54.5 | 67.5 | ° C. | ≥45 |
| Difference between upper and lower softening points (160° C.) | 0.4 | 0.5 | 0.3 | ° C. | \ |

From the above test results, it can be seen that the HTPB-PU-modified asphalts (H3, H5, and H9) has excellent storage stability, high-temperature stability, and low-temperature crack resistance.

Comparative Example 1

The same 70 # base asphalt as in Example 1 was added with 4.5 wt % of an SBS modifier under stirring. At 180° C., a resulting mixture was first stirred for 30 min at 400 r/min, high-speed sheared for 1 h at 3,000 r/min, and then stirred for 30 min at 400 r/min to obtain an SBS-modified asphalt. The performance test results of the 70 # base asphalt and the SBS-modified asphalt are shown in Table 7.

TABLE 7

Performance test results of 70# base asphalt and the SBS-modified asphalt

| Test Item | 70# base asphalt | SBS-modified asphalt | Unit |
|---|---|---|---|
| High-temperature stability | PG 64 | PG 76 | \ |
| Low-temperature crack resistance | PG-22 | PG-22 | \ |
| Brookfield viscosity (175° C.) | 200 | 500 | mPa · s |
| Needle penetration (25° C., 100 g, 5 s) | 64.5 | 51.8 | 0.1 mm |
| Softening point T$_{R\&B}$ | 48 | 69.5 | ° C. |
| Difference between upper and lower softening points (160° C.) | 0.2 | 2.6 | ° C. |

From the comparison of Table 5, Table 6, and Table 7, it can be seen that the HTPB-PU-modified asphalt of the present disclosure could significantly improve the storage stability compared with the conventional SBS-modified asphalt, and has a difference between the upper and lower softening points of not more than 0.5° C., and even could reach 0.2° C. in a preferred embodiment.

The above are merely illustrative of some embodiments of the present disclosure, and the description thereof is specific and detailed, but should not be construed as limiting the scope of the present disclosure. It should be noted that those of ordinary skill in the art can further make several variations and modifications without departing from the concept of the present disclosure, and all of these shall fall within the protection scope of the present disclosure.

What is claimed is:

1. A method for preparing a hydroxyl-terminated polybutadiene-based polyurethane (HTPB-PU)-modified asphalt, the HTPB-PU-modified asphalt comprising the following components in parts by weight: 90 parts to 97 parts of a base asphalt and 3 parts to 10 parts of HTPB-PU, wherein the HTPB-PU is prepared from raw materials comprising an isocyanate and a polyol, the polyol comprises hydroxyl-terminated polybutadiene (HTPB) with a weight percentage of not less than 80%, and the isocyanate is isophorone diisocyanate; and wherein the raw materials comprise 70 parts to 85 parts of the HTPB and 12 parts to 25 parts of isophorone diisocyanate, based on 100 parts by weight of a total weight of the raw materials, and further comprise a chain extender and a catalyst;

the method comprising the following steps:
(1) mixing isophorone diisocyanate with the polyol by stirring at a temperature of 110-130° C. to obtain a PU prepolymer;
(2) adding the PU prepolymer into the base asphalt and stirring at a temperature of 160-190° C. with a stirrer to obtain a mixture; and
(3) adding the chain extender and the catalyst into the mixture obtained in step (2) and continuously stirring to obtain the HTPB-PU-modified asphalt.

2. The method of claim 1, wherein mixing the isocyanate with the polyol by stirring in step (1) is conducted at a stirring speed of 350-500 r/min for 4-5 h.

3. The method of claim 1, wherein the stirring in step (2) is conducted at a stirring speed of 1,200-1,500 r/min for 20-30 min.

4. The method of claim 1, wherein the stirring in step (3) is conducted at a temperature of 160-190° C. and/or for 1.5-2.5 h.

5. The method of claim 1, wherein the chain extender comprises one selected from the group consisting of an alcohol chain extender and a polyamine chain extender; further, the alcohol chain extender comprises at least one selected from the group consisting of ethylene glycol, hexanediol, octanediol, decanediol, 1,3-butanediol, 1,4-butanediol, 1,6-hexanediol, and neopentyl glycol; and the polyamine chain extender is an organic or inorganic primary amine-based or secondary amine-based functional compound with at least two active hydrogen atoms.

6. The method of claim 1, wherein the base asphalt is a petroleum asphalt, and the petroleum asphalt comprises at least one selected from the group consisting of 50 #, 70 #, 90 #, and 110 # base asphalts.

7. The method of claim 1, wherein the HTPB-PU-modified asphalt has a difference of not greater than 0.5° C. between an upper softening point and a lower softening point under a segregation test at 163±5° C.

8. The method of claim 1, wherein the HTPB has a number-average molecular weight of 2,000 to 4,000, and a hydroxyl value of 25 mg·KOH/g to 45 mg·KOH/g.

* * * * *